March 17, 1970     W. G. BUNCHAK     3,501,033
TRACKING AND BRAKING IMPROVEMENT IN 6-WHEEL SHUTTLE CAR
Filed July 1, 1968     2 Sheets-Sheet 2

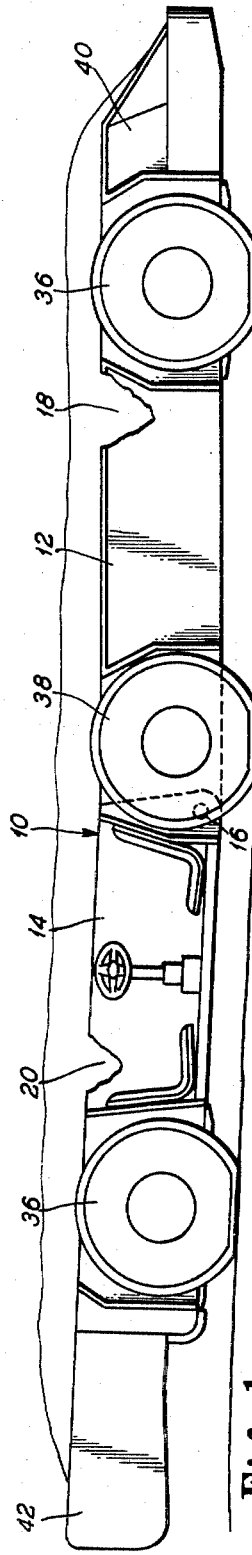
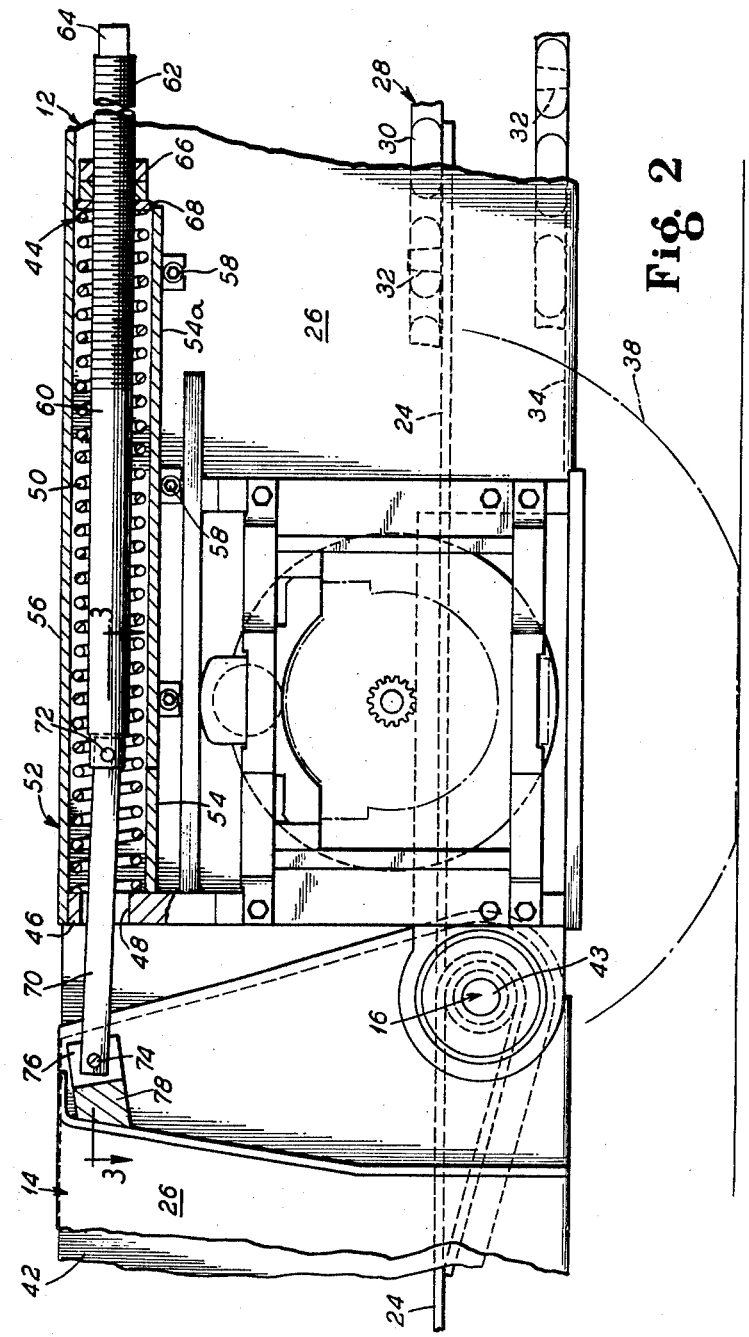

INVENTOR.
William G. Bunchak
BY
Murray A. Gleeson
ATTORNEY

United States Patent Office 3,501,033
Patented Mar. 17, 1970

1

3,501,033
TRACKING AND BRAKING IMPROVEMENT IN
6-WHEEL SHUTTLE CAR
William G. Bunchak, Chicago Ridge, Ill., assignor to
Westinghouse Air Brake Company, Pittsburgh, Pa., a
corporation of Pennsylvania
Filed July 1, 1968, Ser. No. 741,420
Int. Cl. B60p 1/38
U.S. Cl. 214—83.36                  6 Claims

ABSTRACT OF THE DISCLOSURE

A mine haulage vehicle with a pair of body sections interconnected for up and down relative movement about a pivot joint and supported on three pairs of wheels, a center pair of which is driven and braked and is located adjacent the pivot joint. Springs above the joint draw the adjacent body sections together to press the center wheels against the ground for improved traction and braking.

BACKGROUND OF THE INVENTION

The field of this invention is commonly called a shuttle car and is used primarily in underground mines for hauling coal, ore, and the like, outbye of the face to a carry-away conveyor. The body is open at each end and has a bottom conveyor which moves material from a receiving section to a discharge section. It shuttles back and forth in the space between the advancing mine face and the less-frequently advanced conveyor, hence the name "shuttle car."

These shuttle cars have to negotiate sharp curves underground, requiring a short wheel base. Although compact, and low in height, they are very heavy, commonly weighing 10, 20 and more tons when loaded. Because of the combination of a short wheel base, long body length to carry the load, and substantial weight, there is a heavy overhang beyond the end pairs of wheels which, in the case of an articulated 6-wheel shuttle car, tends to lift the center pivot thereby reducing the ground pressure under the center wheels and reducing their driving and braking capabilities.

It is desirable therefore, in a 6-wheel shuttle car, to maintain the ground pressure under the center wheels.

BRIEF SUMMARY OF INVENTION

A principal object of the present invention is to neutralize the overhang beyond the end wheels, in a 6-wheel shuttle car, thereby increasing the ground pressure under the center wheels for improved tramming and braking.

An object of this invention is to provide a relatively simple but rugged and trouble-free spring biasing means above the center pivot joint of a 6-wheel shuttle car body, urging the body sections together along a line of action at a level above the pivot joint to thereby urge the pivot and the adjacent center wheels in a downward direction.

A problem of using a heavy duty coil spring for this purpose is as follows: Such a spring is best utilized with one end held against a stop and the other end movable as required along a straight line of action. Yet the adjacent body sections which are biased by the spring move in an arc about their pivot.

Other objects and advantages will be apparent from the following description taken in connection with the drawings in which:

FIGURE 1 is a side elevation view of a 6-wheel shuttle car constructed in accordance with the principles of this invention;

FIG. 2 is an enlarged, fragmentary, partially sectioned view of FIG. 1, taken with the center wheel removed and showing the parts which comprise the present invention;

2

Figures 3, 4, 5:
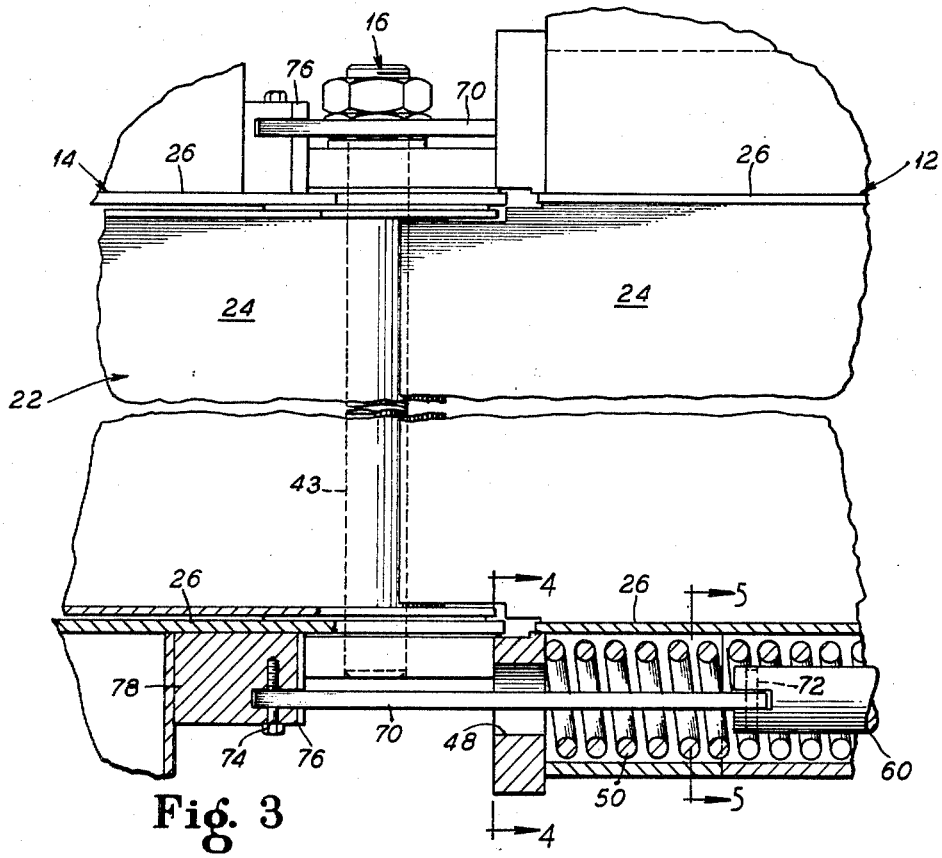

FIG. 3 is an enlarged, fragmentary, sectional view of FIG. 2 taken along the line 3—3; and FIGS. 4 and 5 are fragmentary views of FIG. 3 taken along the lines 4—4 and 5—5 respectively.

Like parts are indicated by like reference characters throughout the figures of the drawing.

In the improved mine haulage vehicle (generally called a "shuttle car" by those familiar with the art) embodiment shown in the drawings, the vehicle generally comprises a material carrying body 10 divided into two relatively articulating body sections 12 and 14 hinged together by hinged articulating pivot means 16 extending transversely across in the lower center region of the car. Said relative articulating body sections 12 and 14 have receiving and discharge chambers 18 and 20 which cooperate to provide a material receiving compartment 22 extending lengthwise of the vehicle. Said compartment is generally trough shaped having a bottom 24 and upstanding side walls 26 in each section. Endless conveyor means 28 comprises a chain 30 having flights 32 trained in a conveying reach running along the floor plates 24 and return reach running along inwardly extending edge rails 34 at the bottom of the car body.

The shuttle car body 10 is provided with a pair of steering wheels 36 located intermediate the ends of body sections 12 and 14. A center pair of wheels 38 are rigidly mounted to the sides of the body section 12 adjacent the pivot means 16.

The present invention is concerned primarily with a shuttle car in which the center wheels 38 are both power driven, and braked. Detailed mechanism for power-tramming the wheels, for braking the center wheels, and for steering the end wheels are shown and described in the prior art including Patent 3,302,739 and will not be repeated here.

The weight of the overhanging body portions 40 and 42, beyond the end wheels 36, tends to lift the center wheels 38 out of effective ground engagement especially when the car is passing over a rough floor. The present invention is concerned with a simplified, compact, rugged, easily maintained spring and link mechanism for urging the pivot joint 16 and the center wheels 38 downward, to increase the tramming and braking effectiveness.

The pivot means or joint 16 is the subject of a co-pending application Ser. No. 741,381 of Joseph G. Ivy and details will not be repeated here.

As best shown in FIG. 2, the pivot means 16 is connected at the lower level of the body sections 12 and 14 and includes a transverse pivot shaft 43 running across the car between the upper and lower runs of the conveyor 28. As the car passes through dips, and horsebacks, the two body sections will pivot up and down relative to one another about the pivot 16. During such action, the side walls of the two body sections, at their adjoining ends, will move in an arc relative to one another about the pivot 16.

Spring biasing means 44 is provided on each side of the vehicle and includes a stop 46 with an aperture 48 welded to the interior of side wall 26, at the end of the body section 12 adjacent section 14. A heavy duty coil spring 50 is engaged with the stop 46 and is guided along the upper margin of the body section 12 by a tubular spring guide 52. As shown in FIG. 4, this tubular guide comprises a right-angle curved plate 54 welded respectively to the upper marginal plate 56 and side wall 26 of the body section 12. A same-shape extension 54a of the curved plate 54 is removably attached to the side wall 26 by bolts 58 and furnishes access to the spring for maintenance or adjustment. Thus, the tubular spring guide in the present case comprises top and side walls 56, 26 and curved plates 54, 54a. Within the spring 50 is an elongated tension rod 60 having a threaded exterior end 2 terminating in a square 64. A spring compression adjusting nut 66 is threaded to the end of the rod. A thrust washer 68 is interposed between the exterior end of the spring and the nut.

At the end of the tension rod remote from the nut 66, a link 70 is articulateably connected by a pin 72 enabling relative vertical angular movement between the link and the rod. The link extends through the stop opening 48 which, as shown in FIG. 4, is vertically elongated to accommodaate the up and down swinging movement of the link. The opposite end of the link is pivoted on horizontal pin 74 held by a clevis 76 in block 78 fastened as by welding to the side wall 26 of the other shuttle car body section 14.

Thus it will be apparent that the tension rod 60 and link 70 comprise, in effect, flexible link means connecting the exterior end of the spring 50 to the other body section 14.

An important factor in the application of the invention here is that the spring 50 must be of very substantial size and strength to hold the center wheels 38 in positive engagement with the ground in spite of the heavy overhanging body sections 40 and 42. A coil spring is preferred for that purpose and for best results it must move in a straight line of action as it is constrained to do within the tubular guide 52. Yet the point of attachment 74 to the adjacent body section 14 moves in an arc. By employing the pivotal link 70, as shown, the two body sections can move back and forth relative to one another in an arcuate path above the pivot 16 while the spring 50 is extending and contracting along a straight line of action at a level about the pivot 16.

To increase the compression on the spring 50, and therefore increase the downward pressure on the pivot point 16 and the center wheels 38, it is necessary only to tighten the nut 66. The square 64 is provided on the end of the tension rod 62 to hold the latter during such adjustment, thereby relieving the pivot pins 72 and 74 of torsional loads. To provide access to the nut 66 during adjustment, the spring guide plate 54a may be removed.

In operation, as the shuttle car climbs out of a roll or gully, as shown in FIG. 1, the body sections 12 and 14 will bend upward relative to one another about the pivot 16. This causes the link 70 to move through the aperture 48 toward the spring 50, allowing the latter to extend. Under the reverse condition, where the shuttle car goes over a bump or horseback, the two body sections 12 and 14 will move downwardly relative to one another about the pivot 16. This will cause the link 70 to move through the aperture 48, away from the spring 50, compressing the latter. In both situations, as well as ordinary level run, the spring 50 will hold the wheels 38 solidly against the ground to maintain their effective tramming and braking engagement.

While I have herein shown and described one form in which the invention may be embodied, it may readily be understood that various variations and modifications in the invention may be attained without departing from the spirit and scope of the novel concepts thereof.

I claim as my invention:

1. An articulated mine haulage vehicle comprising a pair of interconnected body sections having all ends open with the adjacent ends open to each other to define a continuous floor passage in said body sections;
   said body sections having upwardly extending side portions;
   conveying means mounted in said body sections for cooperating with said floor passage to convey material through said body sections for storage, receiving and discharge purposes;
   pivot means connecting the lower level of said body sections at said adjacent ends enabling the upper portions of said body sections at said adjacent ends to move pivotally through an arc relative to each other;
   a pair of traction and braking wheels mounted on one of said body sections adjacent said pivot means;
   steerable supporting wheels for each of said body sections intermediate the ends thereof;
   means for driving and braking said traction and braking wheels;
   spring biasing means operatively connecting said upwardly extending side portions of the respective body sections at the upper level thereof above said pivot means for biasing said opposite ends of said body sections toward each other for biasing said traction and braking wheels downward to increase the effective ground pressure thereof; said spring biasing means including on each side of said vehicle:
   a stop supported on the side portion of one of said body sections at a level above said pivot means;
   an elongated spring having one end abutting said stops;
   a spring guide carried by said one body section effective to guide the opposite end of the spring in a linear direction having a generally horizontal line of action above said pivot means; and
   means connecting said opposite end of the spring to the side portion of the other of said body sections and urging said pivot means and said traction and braking wheels downward while accommodating simultaneous arcuate movement of said adjacent side portions and linear movement of said opposite end of the spring.

2. An articulated mine haulage vehicle comprising a pair of interconnected body sections having all ends open with the adjacent ends open to each other to define a continuous floor passage in said body sections;
   said body sections having upwardly extending side portions;
   conveying means mounted in said body sections for cooperating with said floor passage to convey material through said body sections for storage, receiving and discharge purposes;
   pivot means connecting the lower level of said body sections at said adjacent ends enabling the upper portions of said body sections at said adjacent ends to move pivotally through an arc relative to each other;
   a pair of traction and braking wheels mounted on one of said body sections adjacent said pivot means;
   steerable supporting wheels for each of said body sections intermediate the ends thereof;
   means for driving and braking said traction and braking wheels;
   spring biasing means operatively connecting said upwardly extending side portions of the respective body sections at the upper level thereof above said pivot means for biasing said oppoiste ends of said body sections toward each other for biasing said traction and braking wheels downward to increase the effective ground pressure thereof; said spring biasing means including on each side of said vehicle:
   a stop supported at said adjacent end of one of said body sections at a level above said pivot means;
   an elongated compression spring having one end abutting said stop;
   a spring guide extending along the upper portion of said one body section effective to guide the opposite end of the spring in a linear direction having a generally horizontal line of action above said pivot means; and
   flexible link means connecting said oppoiste end of the spring to the side portion of the other of said body sections and urging said pivot means and said traction and braking wheels downward while accommodating simultaneous arcuate movement of said adjacent side portions and linear movement of said opposite end of the spring.

3. An articulated mine haulage vehicle according to claim 2 in which said guide is an elongated tubular housing embracing said spring.

4. An articulated mine haulage vehicle according to claim 3 in which
said tubular housing contains spring adjustment means for varying the compression of said spring; and
said tubular housing includes a portion which is open to facilitate adjustment of the spring and associated elements.

5. An articulated mine haulage vehicle according to claim 2 in which
said stop is provided with an aperture; and
said flexible link means comprises a tension rod extending within said spring, said tension rod having a tension adjusting nut threadedly engaged with the end remote from said stop, and a thrust washer between the nut and the spring, said spring being compressed between the stop and the washer, said tension rod further having a link pivotably connected to the tension rod to enable relative vertical angular movement therebetween, said link extending through said stop aperture and being pivotably connected to the side portion of the other body section.

6. An articulated mine haulage vehicle according to claim 5 in which said stop aperture is vertically elongated to accommodate vertical swinging movement of said link.

References Cited

UNITED STATES PATENTS

| | | | |
|---|---|---|---|
| 3,073,464 | 1/1963 | Hoover | 214—83.36 |
| 3,277,974 | 10/1966 | Brill | 180—22 |

ALBERT J. MAKAY, Primary Examiner

U.S. Cl. X.R.

180—22